May 15, 1962 F. J. CANTALUPO ETAL 3,034,371
DETACHABLE VALVE ACTUATING MEANS
Filed Oct. 6, 1960 6 Sheets-Sheet 1

Inventors.
Francis J. Cantalupo,
Edmond P. DeCraene &
John P. Doelger.
By Joseph O. Lange Atty.

Inventors.
Francis J. Cantalupo,
Edmond P. DeGraene, &
John P. Doelger.
By Joseph O. Lange
Atty.

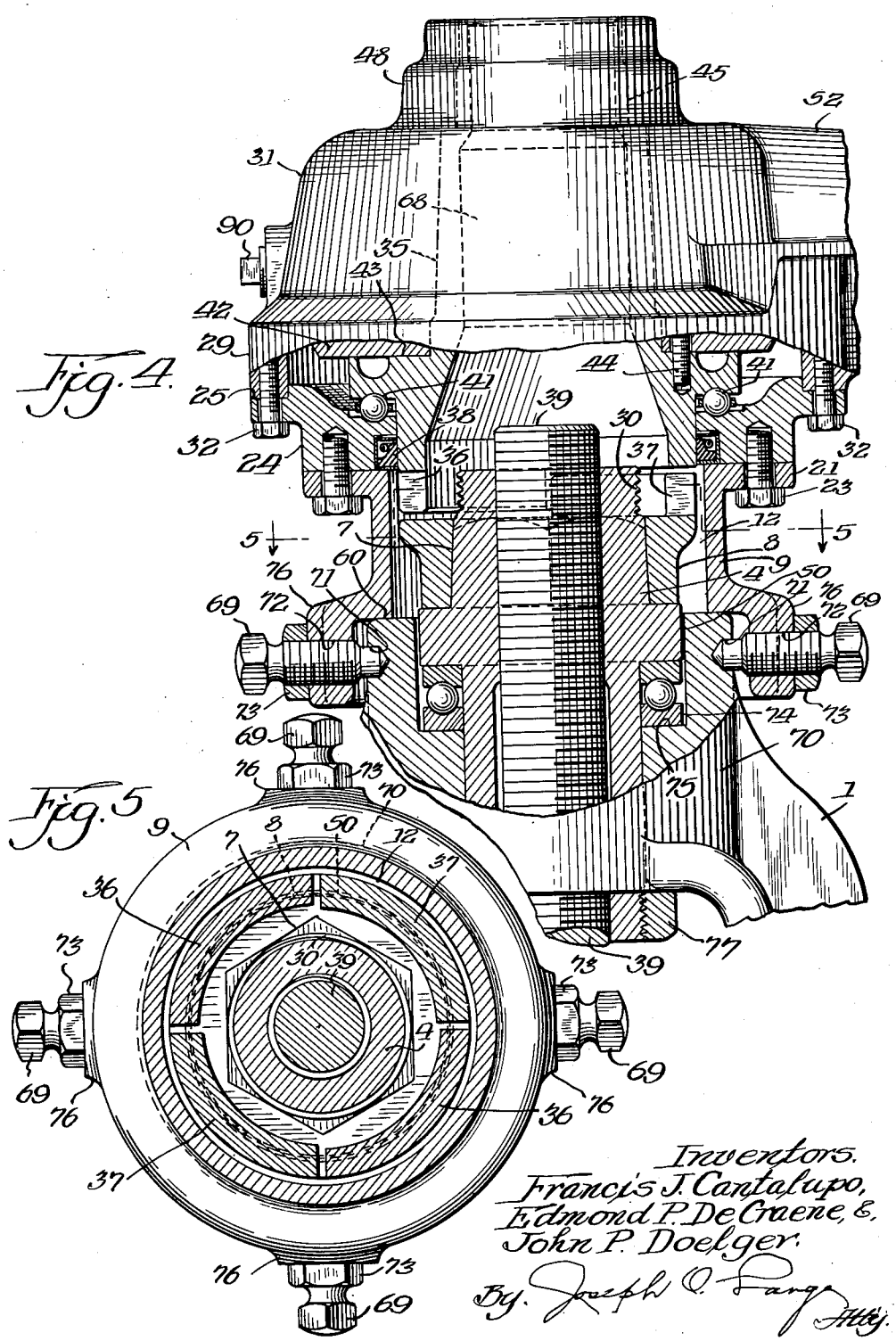

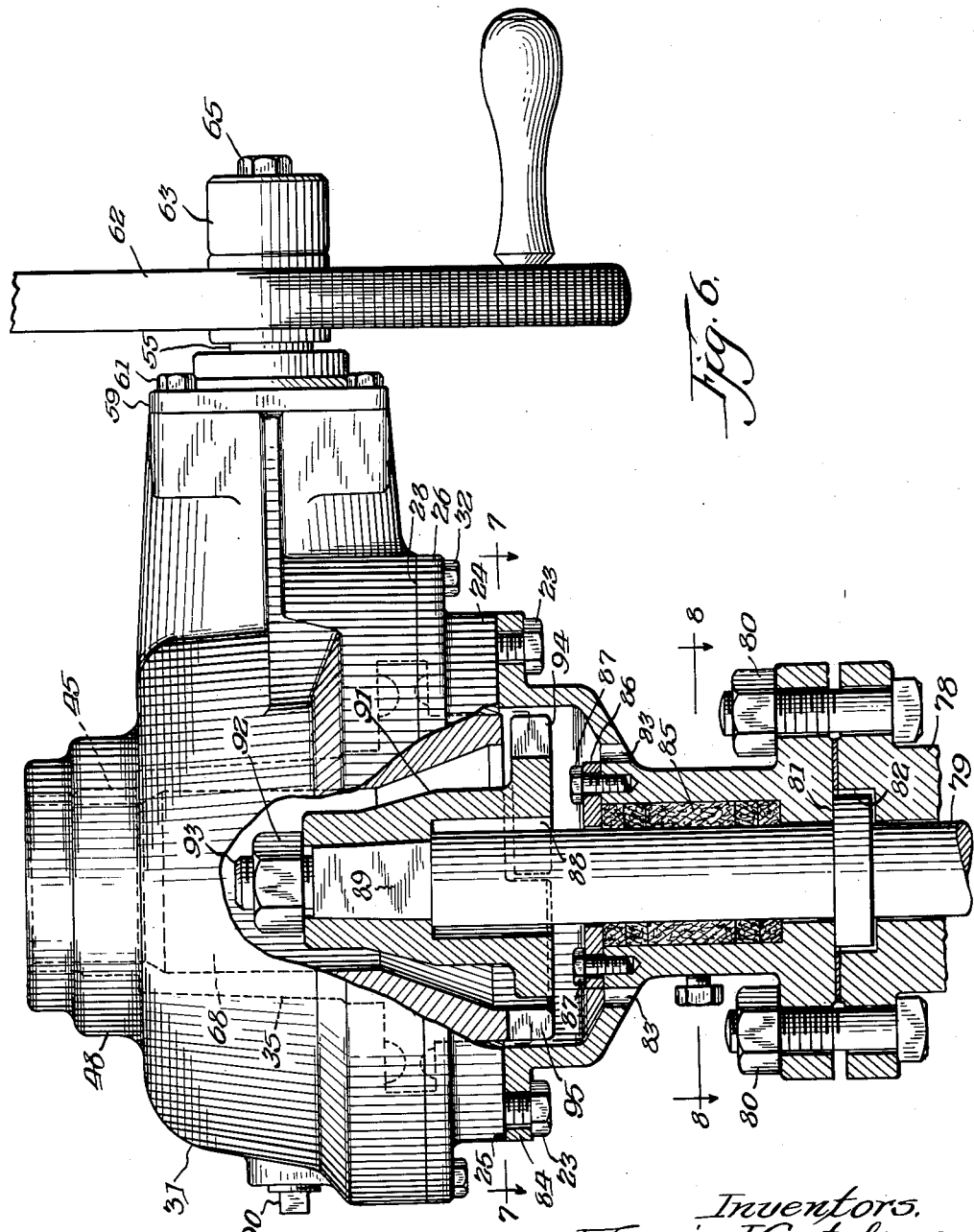

May 15, 1962  F. J. CANTALUPO ETAL  3,034,371
DETACHABLE VALVE ACTUATING MEANS
Filed Oct. 6, 1960  6 Sheets-Sheet 5

Inventors.
Francis J. Cantalupo,
Edmond P. DeGraene &
John P. Doelger,
By Joseph O. Lange
Atty.

May 15, 1962 F. J. CANTALUPO ETAL 3,034,371
DETACHABLE VALVE ACTUATING MEANS
Filed Oct. 6, 1960 6 Sheets-Sheet 6

Inventors.
Francis J. Cantalupo,
Edmond P. DeCraene, &
John P. Doelger.
By Joseph O. Lange
Atty.

United States Patent Office 3,034,371
Patented May 15, 1962

3,034,371
DETACHABLE VALVE ACTUATING MEANS
Francis J. Cantalupo, Chicago, Edmond P. De Craene, Westchester, and John P. Doelger, Chicago, Ill., assignors to Crane Co., Chicago, Ill., a corporation of Illinois
Filed Oct. 6, 1960, Ser. No. 61,019
6 Claims. (Cl. 74—423)

This invention relates broadly to valve actuating means, and, more specifically, it is directed to an attachable gear unit provided with suitable adaptor means for effecting attachment to the valve.

At the outset, in order to acquire a better appreciation of the significance of this contribution, it should be understood that convenience in providing for valve operation in the field is important, and this is particularly true where the valves are already installed and it becomes necessary to convert direct hand operation to geared operation.

Therefore, it is one of the more important objects of the present invention to provide for gear operated valve actuated means capable of being readily mounted by means of suitable adaptors to a conventional handwheel operated valve as taken from the manufacturers' stock upon removal of the handwheel and minor modifications of the valve in the field.

Another important object is to provide for a valve actuating mechanism in which a relatively flexible clutch type of connection is provided whereby the valve yoke sleeve adaptor is conveniently driven to operate the valve and to practically eliminate the effect of misalignment. It will be further obvious that such provision enables the making of an easier and quicker assembly of the valve actuating means with the valve than heretofore accomplished.

Another object is to provide for a valve actuating mechanism in which various adaptors can easily be applied to suit the type of valve upon which they are used, as, for example, those well known in the trade and identified as the split-type yoke type, ball-bearing yoke type, or valves employing a non-rising stem.

Another object is to provide for an economical and convenient method of converting a handwheel-operated valve from regular stock to a gear-operated valve.

Another object is to provide an economical and convenient means of operating a valve through a gear train by means of a portable pneumatic or electric motor drive.

Other objects and advantages will become more readily apparent upon proceeding with the following description read in light of the accompanying drawings, in which:

FIG. 4 is a fragmentary sectional assembly view of a modified construction;

FIG. 5 is a transverse sectional view taken on the line 5—5 of FIG. 4;

FIG. 6 is a fragmentary sectional assembly view of the actuating mechanism embodying this invention applied to a further modified construction;

Figure 7:
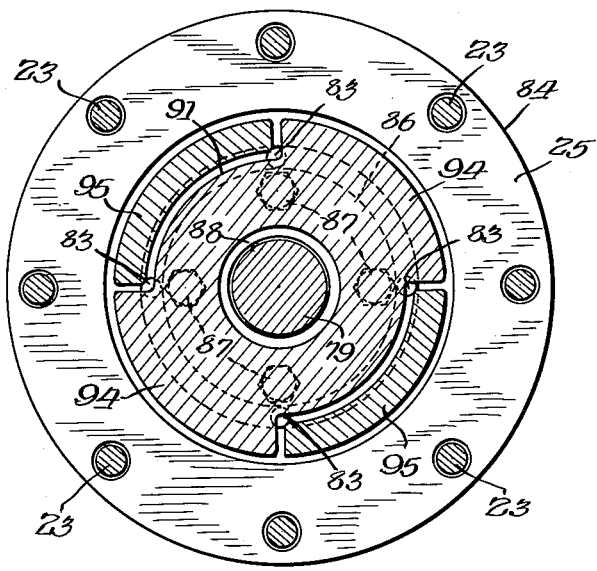
Figure 8:
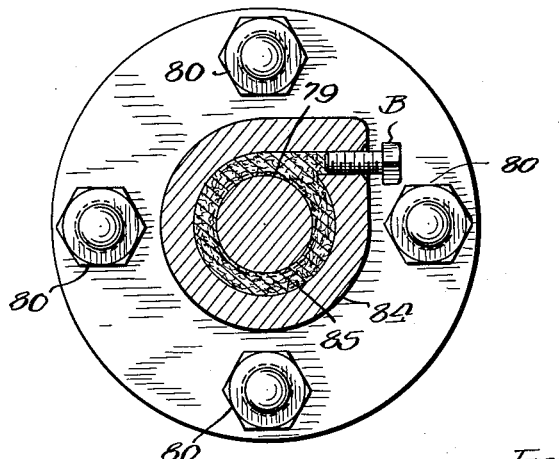
Figure 9:
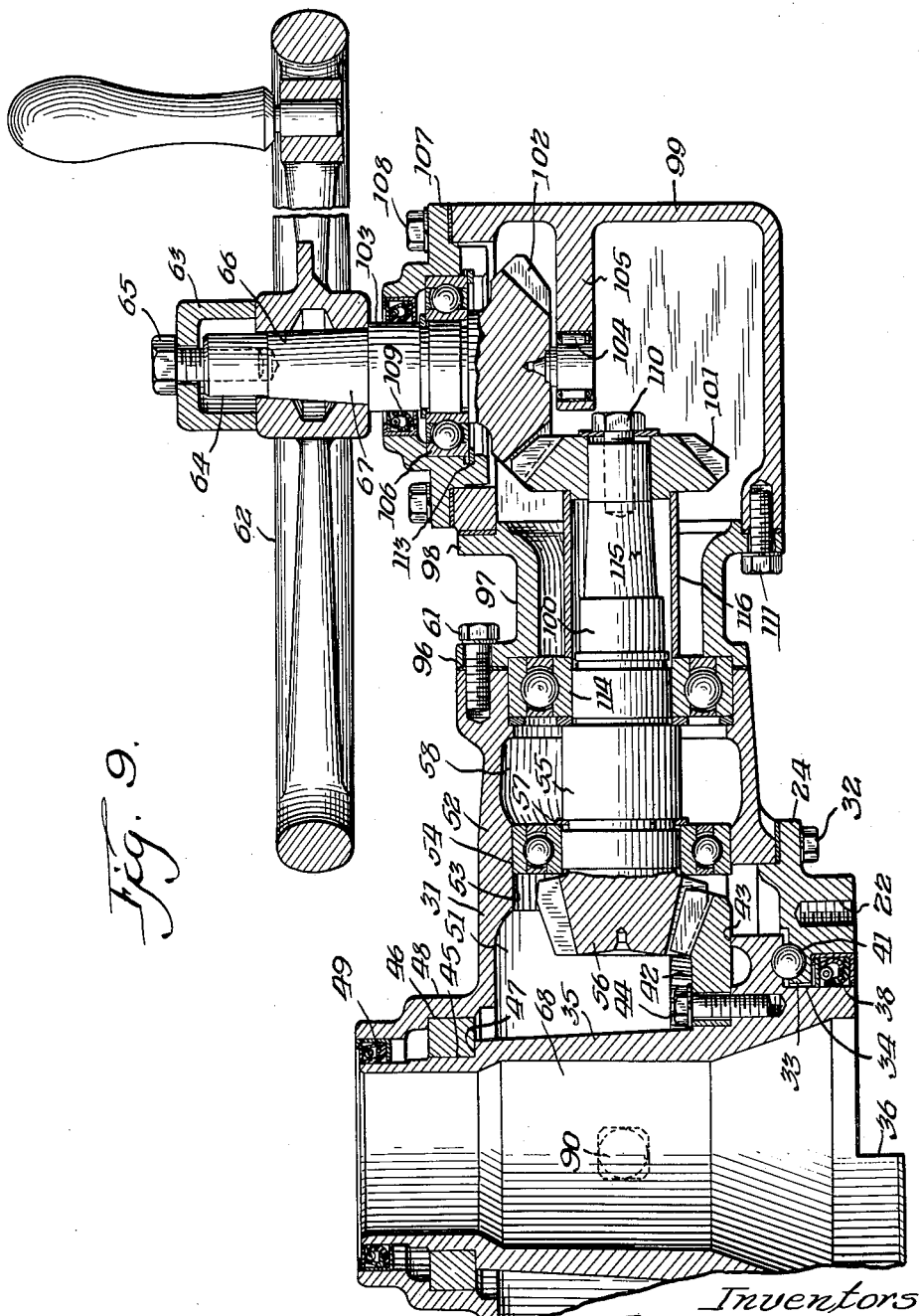

FIGS. 7 and 8 are respective fragmentary sectional views taken on the lines 7—7 and 8—8 of FIG. 6; and FIG. 9 is a fragmentary sectional assembly view of another modified form of the operating mechanism of this invention.

Similar reference numerals refer to similar parts throughout the several views.

Figure 1:
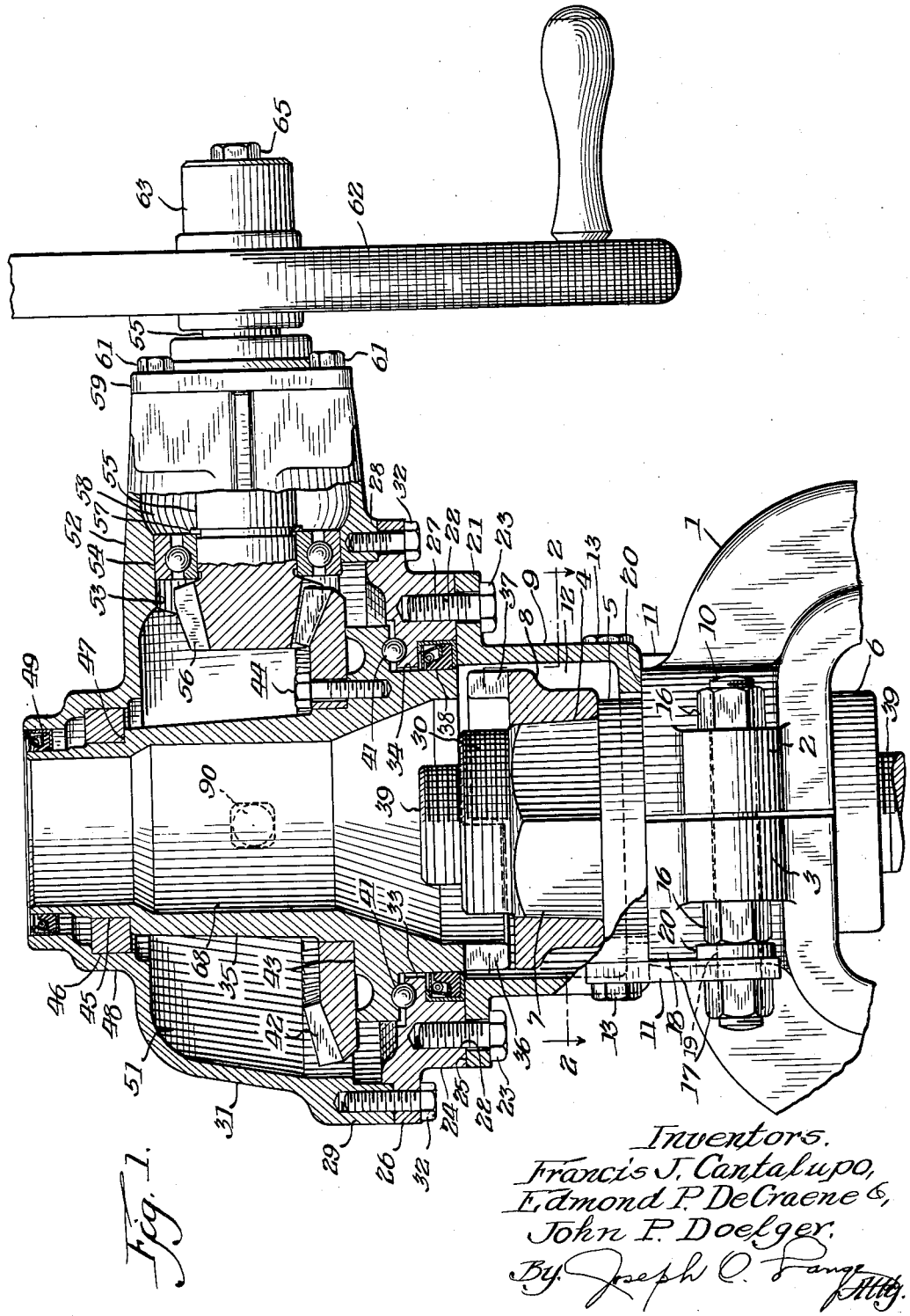
FIG. 1 is a fragmentary sectional assembly view of a preferred embodiment of the actuating mechanism of this invention.

Referring now to FIG. 1, a conventional split-type valve yoke designated 1 is shown, having the split hub construction as indicated at 2 and 3. The purpose of the split hub construction is to permit reception of the flanged yoke sleeve 4, having the upper flange 5 and the lower flange 6 as indicated to prevent axial movement of the yoke sleeve. The upper portion of the yoke sleeve 4 is preferably polygonally formed in order to normally receive a handwheel (not shown), but in this particular case it is polygonally formed as at 7 to receive in non-rotatable relation the yoke sleeve adaptor 8 as shown.

As shown more clearly in FIG. 1, a yoke adaptor 9 of substantially cup-like configuration is mounted on the yoke. It is provided with a chamber 12 within which the yoke sleeve adaptor 8 and the yoke sleeve 4 are received as shown. Said yoke adaptor 9 cooperates with the split yoke construction by means of depending removable plates 11 attached by means of bolts 13 to the yoke adaptor pads 18, the plates 11 being bolted as at 16 and 17 to the projecting ears of the yoke. As indicated, to effect said latter attachment, the extension bolts 10 are employed, lengthened to provide the extended threaded portions 19. Thus, it will be clear that the yoke adaptor 9 is firmly held against axial and rotational movement by means of the connections with the said extension bolt 10. Nuts 16 engage the split hub construction of the yoke as shown at 2 and 3.

Preferably at its upper annular portion, the yoke adaptor member 9 is flanged as at 21. It is also provided with suitable bolt holes 22 to receive the cap screws 23 to allow for the mounting flange 24 to be received thereon and supported on the upper surface 25 thereof. The flange portion 26 is preferably of circular configuration and is tapped as at 27 to receive the said cap screws for purpose of holding the mounting flange 24 firmly in assembled position as shown. On its upper surface portion as indicated at 28, the said mounting flange receives the similarly formed portion 29 of the driver housing 31, the housing being held in position on the mounting flange by means of the cap screws 32.

It is to be noted that the mounting flange 24 is suitably bored as at 33 to receive the depending shank portion 34 of the drive sleeve 35. It will also be noted that the drive sleeve 35 at its lower portion is annularly recessed whereby to provide the engaging means or clutch formed with an annular abutment as at 36 to fit between in spaced annular relation thereto and engages a similarly formed abutment 37 to constitute a clutch for the yoke sleeve adaptor 8. The detailed manner in which such interengaging abutments are positioned and thereby function as the clutch engagement between the said adaptor means and the sleeve is more clearly shown in the sectional view presented in FIG. 2. The explanation of the purpose for which this cooperation takes place will be described in detail hereafter. It will be noted, as shown in FIG. 1, that a fluid sealing ring 38 is preferably interposed between the upper surface 25 of the yoke adaptor 9 and the mounting flange 24 as shown, whereby to retain lubricant within the actuator mechanism and to avoid the accumulation of foreign matter otherwise detrimental to the bearings and gearing. Further, for expediting the rotation of the drive sleeve 35, annularly arranged ball bearings 41 are provided, mounted in a suitable raceway as indicated.

In non-rotatable relation to the rotatable drive sleeve 35, a driven bevel gear 42 is mounted upon the surface 43 and is preferably held against rotation relative to the said sleeve by means of a plurality of annularly spaced apart cap screws 44, the bevel gear teeth extending annularly and continuously therearound on an upper portion thereof as shown. At its upper limit, for purpose of its guidance and support against transverse forces, the drive sleeve 35 is provided with the reduced portion 45 and relatively snugly received within the drive sleeve bearing 46 of a suitable bearing material, the bearing being supported and shouldered upon the annular surface 47 of the said drive sleeve 35. At the upper portion of the housing cylindrical extension 48, an oil seal member 49 is mounted to assist in avoiding the escape of suitable lubricant used within the housing chamber 51 for purpose of expediting the operation of the mechanism as well as to protect the gear against foreign matter.

The driver housing 31 is provided with a lateral extension 52 bored as at 53 to receive the shaft roller bearing 54 within which the shaft 55 carrying the pinion gear 56 is journally mounted. In order to hold the bearing 54 in position, a retaining ring 57 is preferably employed as indicated to bear against the shoulder portion of the bearing 54. The housing chamber 58 at its outer end portion is suitably capped as at 59 by means of the bolts 61. The pinion shaft 55 projects therethrough to non-rotatably receive the handwheel 62, the latter member being non-rotatably mounted on the shaft 55 by means more clearly shown in sectional view of FIG. 9, as indicated. A cover plate 63 receives the upper tapped polygonal portion 64, an integral part of the pinion shaft, the cap being held in place by means of the cap screw 65, the handwheel being formed as at 66 to receive the tapered shank 67 of the said shaft. It will be appreciated of course that when it becomes desirable, the handwheel 62 may be replaced by an air or electric power portable driving member for fast operation. It will be appreciated that the drive sleeve 35 is made hollow as indicated at 68 in order to allow for receiving the upper end of the rising stem 39 to be accommodated therewithin in the course of operating the valve.

Assume that it becomes necessary in the field to remove the handwheel 62 to permit operation with a portable motor operator. In such case, the handwheel nut 65 is removed together with the handwheel 62 and the handwheel cover 63.

Both studs 10, which in the conventional direct handwheel operated valve are only of sufficient length to accommodate the nuts 16, are provided with extensions 19 of sufficient length to engage the spacers 20, where applicable, the plates 11, and the nuts 17. Assume that the rising stem valve here (outside screw and yoke) to have the gear operator applied, the handwheel (not shown) ordinarily mounted on the polygonal portion 7 is removed after removing a retaining nut (also not shown) normally engaging the threaded portion 30 to hold the handwheel in place. The yoke hub adaptor 9 is mounted on the yoke hub halves 2 and 3 to be supported on the yoke hub surface as shown. The plate 11 for the yoke adaptor is then mounted on the yoke hub, placing the plate 11 in position on the bolt stud extended portion 19 hand tight. The yoke sleeve adaptor 8 is then mounted in place on the yoke sleeve polygonal portion 7 of the yoke sleeve 4. The nuts 17 for effecting the plate attachment are then tightened so that the yoke adaptor 9 is positioned concentric with the yoke sleeve adaptor 8, thereby allowing for one of the clutch portions 37 to be suitably received within the chamber portion 12 of the yoke adaptor 9.

The gear unit contained within the housing 31 is then placed in position on top of the yoke adaptor 9 to contact the surface 25. In this position, the pinion shaft 55 preferably extends at right angles to the run of the valve, unless otherwise specified, and is fastened in place by means of the bolts 23. If the handwheel 62 is to be used, it will be left in position as shown, but if it is desired to remove it or to allow another shaft arrangement to be employed, such as that shown in FIG. 9, the handwheel can be replaced and a gear arrangement can be substituted. Preferably, upon such assembly being completed, a gear lubricant is added to the chamber 51 through plugged opening 90 for purposes previously mentioned. It will be clear that the conversion to a rapid easy gear operation can be made on valves conveniently without removing them from the pipeline. No special yoke casting is required, nor brackets. A basic gear operator is used with a simple two-piece adaptor.

In FIG. 4, a further modified form of gear conversion construction is illustrated, which relates to the employment of an operator of the same invention applied to a valve yoke, wherein a valve having a rising stem and a ball bearing yoke sleeve is used. In the instant modified construction, the valve yoke 1 is provided with an integral hub 70 as distinguished from the split type of yoke construction hereinabove described and a rotatable ball bearing yoke sleeve 50 is provided employing the ball bearings 74 mounted upon the inner annular shoulder 75 of the said yoke hub. In this construction, it will be apparent that the yoke adapter 9 follows the general construction previously described in connection with FIGS. 1 to 3 inclusive, but in the instant modification, it is to be noted that the lower portion thereof, for effecting attachment of the adaptor 9 to the yoke 1, has preferably oppositely disposed integral lugs or bosses threaded as at 72 to receive the set screws 69. The integral yoke hub 70 is severally drilled as at recesses 71 to receive the dog-end or reduced limits of the holding set screws 69, the latter recesses being drilled when the adaptor 9 is shouldered upon the annular surface 60 at the top of the hub 70.

As described in connection with FIGS. 1 to 3 inclusive, the drive sleeve 35 in the instant construction is similarly provided with the clutch arrangement having the lugs 36 for engagement with matching lug portion 37 of the yoke sleeve adaptor 8. A driven gear 42 is applied in the same manner as described hereinabove, and, in all other respects, the actuating mechanism functions as described in connection with FIGS. 1 to 3. It will be appreciated that the only substantial difference here lies in that a ball bearing yoke sleeve 76 is used and also that an integral hub is employed instead of a split yoke with the modified adaptor 9. The ball bearing yoke sleeve 4 is held in place on the shoulder 75 by means of the nut 77, which is threadedly engaged with the yoke sleeve as shown. Here, similarly, it is economical and convenient to convert a normally handwheel-operated valve by detaching the wheel from the attaching threads 30 of the yoke sleeve 4, mounting mounting the yoke sleeve adaptor 9, countersink the holes at 71, then bolt the adaptor in position as shown. The operator is ready for use.

This invention also has application to a non-rising stem valve, and this modified form is shown in FIG. 6, in which a conventional bonnet journally receives the non-rising stem 79, the latter member having an integral collar portion 81 received within the yoke or bonnet recess 82. The actuator adaptor 84 is bolted to the valve bonnet 78 by means of the bolting 80 and replaces the conventional stuffing box (not shown) that is normally used on direct handwheel-operated non-rising stem valves. The upper portion of the stuffing box which is incorporated in the actuator adaptor 84 is sealed by means of a cap 86, bolted in place as at 87 within the recess 88 of the adaptor 84. In this construction, the upper end portion of the stem, as at 89, is tapered and polygonally formed to receive the stem adaptor 91 in non-rotatable relation thereto, being snugly fitted into the polygonal portion 89 and held in place by means of the nut 92 mounted on the threaded shank 93 in place of the handwheel (not shown) which is normally mounted on the polygonal portion 89 used on direct handwheel-operated valves. The drive sleeve 35 in this modified construction is similarly made hollow, as at 68, to receive the adaptor 91 and the attachment means therefor at 92 and 93. Likewise, as in the previously described forms, a driven gear 42 (not shown) but of the same form as in the other constructions will be mounted upon the driven sleeve 35 in the manner as shown and described in connection with FIG. 1. The driven sleeve 35 is also journally supported at its upper end portion, as indicated at 45, in the same manner as described in connection with FIG. 1.

A removable plug 90 supplies the gear lubricant for the housing 31 for the driven gears in the same manner and for the same purpose as described in connection with FIG. 1. The stem adaptor 91 on its lower enlarged end portion limits is provided with the clutch lugs 94 for engagement with similar portions 95 on the adaptor 91, the general arrangement being similar to that shown in plan section of FIG. 5. Functioning also in a similar manner previously described, a handwheel 62 is mounted on the shaft 55 and is removable and interchangeable with any suitable motor driven means (not shown) by removal of the cover 63 and retaining nut 65, the general assembly following the same cross-sectional arrangement shown in FIG. 9 at 63 to 66 inclusive. Thus, it should be clear that by the relatively simple expedient of removing the handwheel (not shown) from its usual polygonal attachment at 89 and replacing it with the adaptor 91, then applying the housing 31, and bolting the unit to the mounting flange 26, the changeover is easily and quickly made to gear operation.

Referring now to a further modified construction, attention is directed to FIG. 9. In this modification, it should be noted that if it is desired the pinion gear shaft for alternate use with a handwheel or with a motor driven mechanism may be mounted in a plane parallel to the valve stem. In all other respects, the general construction and functioning follows the outline described in detail in FIGS. 1 to 3 inclusive, except that it will be noted that the flange 59 of FIG. 1 is replaced with the complementary flange 96 in FIG. 9 to provide for attachment of an independent housing 97. The said flange at an opposite end limit as at 98 receives the housing 99 for the driven mitre gear 101 attached to the shaft 55. Within the housing 99, a pinion mitre gear 102 is mounted on the vertically extending shaft 103, the mitre gear 102 being centered and mounted on the bearing 104 housed within the transverse integral rib 105 on the housing 99. The shaft 103 is further journaled within the ball bearing 106 mounted within the bearing retainer cap 107 and bolted thereto by means of the annularly spaced-apart cap screws 108. The remaining construction is converted and completed in the same manner to receive either the handwheel 62 as shown or a portable driving means (not shown) by removal of the handwheel cover 63 and nut 65 as previously referred to. In this construction, the advantage is enjoyed of being able to operate the valve, for example, in a pit below floor level, and being able to do so from above the actuating mechanism, either with the handwheel or with the portable valve driver, using either an air or electric power operator.

Figure 2:
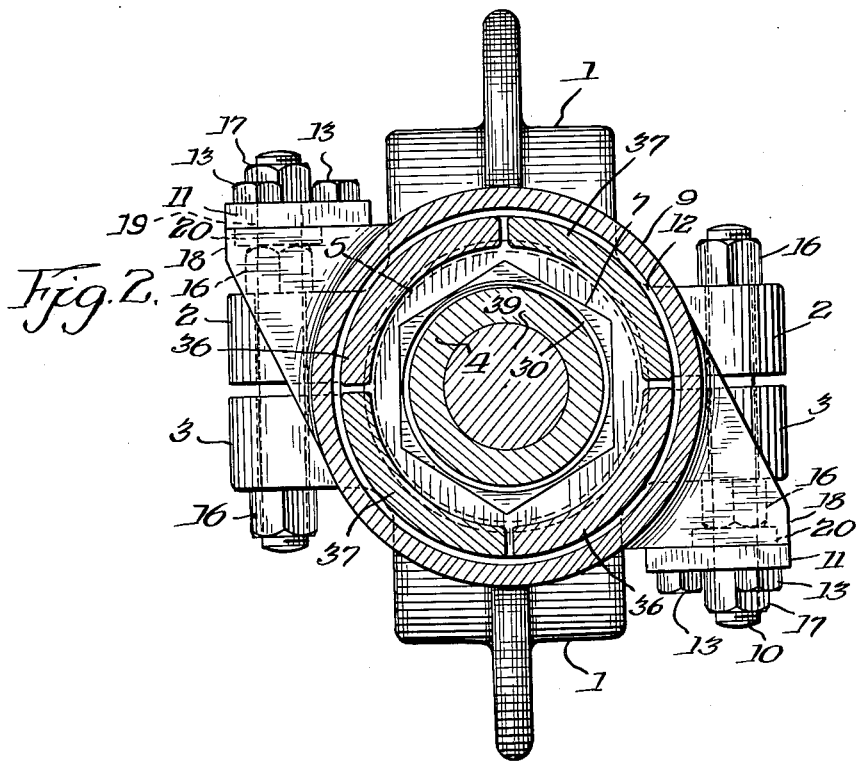
FIG. 2 is a transverse sectional view taken on the line 2—2 of FIG. 1.
Figure 3:
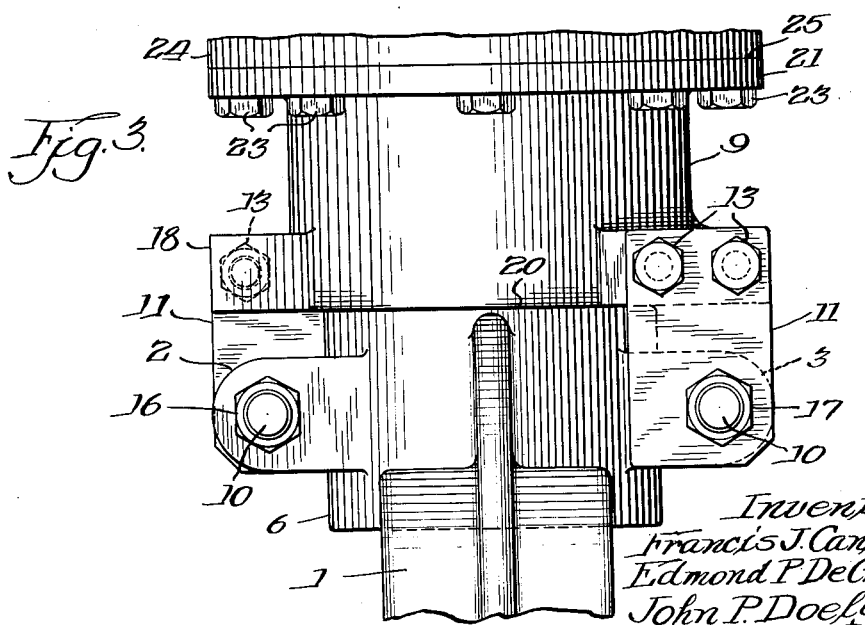
FIG. 3 is a fragmentary exterior view showing plates for attaching the adaptor to split-yoke type valves.

The manner of assembly for all of the modified forms described follows the pattern given in connection with FIGS. 1 to 3 inclusive, so that it is deemed unnecessary to repeat the detailed description by which such functioning is accomplished.

It will also be apparent that while a number of different embodiments have been illustrated and described, this has been done merely in an effort to give an illustration of the versatility of this invention in its application to a wide variety of valves, regardless of whether a rising or non-rising stem is used, or whether a split yoke or a ball bearing yoke sleeve construction is employed. It should be clear therefore that the invention is capable of application to many other forms not herein described, and the scope of the invention therefore should be measured by the scope of the appended claims, considered in light of the art to which it relates.

We claim:

1. In a valve actuator construction suitable for manual operation, the actuating means therefor including a stem and a yoke, a stationary hollow adaptor element removably attached to the yoke upon removal of a portion of the initial actuating means, a drive sleeve member overlying an outer end of the said stem, a housing for journally supporting the drive sleeve, a second adaptor with upper surface means engageable with the said drive sleeve element and cooperating with an outer end portion of the stem to predeterminately move the latter upon movement of the second named adaptor element, the said drive sleeve being contained within the said housing except for that portion engageable with the said second adapter, a driven gear non-rotatably mounted on the said drive sleeve, a pinion gear in mesh with the said driven gear, a shaft journaled in the said housing for effecting rotation of the pinion gear, the shaft being in a horizontal plane above the plane defining the axis of the journalling support in the housing for the said drive sleeve and projecting from an end portion of the housing perpendicular to the axis of said stem, the said second adaptor and the drive sleeve having oppositely disposed annular surface portion for imparting an impact to the said stem preliminary to effecting initial movement of the latter member, and removable means on an end portion of the said shaft forming an extension of the said housing for attachment to an independent substitute driving means whereby to rotate the said shaft and move the stem through the said drive sleeve and said second adaptor element.

2. Valve actuating means having a movable stem and a closure means actuated by movement of the stem initially connected to a removable handwheel or the like, an adaptor member mountable over said stem, a yoke member comprising a pair of arms enclosing at an upper end thereof at least a portion of said adaptor member, a drive sleeve having a lower portion engageable by the said adaptor member, a driven gear non-rotatably mounted on the drive sleeve, a housing for the drive sleeve and driven gear, a yoke adaptor axially aligned above the stem adaptor supporting the said housing, a mounting flange between the said housing and said yoke adaptor for effecting attachment of the said housing to the yoke, bracket means including removable plates for attaching the flange to the yoke and mounted thereon substantially at the juncture of the yoke arms, a drive gear meshing with the said driven gear, a shaft for the said drive gear above the first named adaptor member, the shaft having a portion forming an end limit of the said housing, the latter limits of the shaft having end connecting means providing for selective manual operation or connection to a motor driven means whereby to rotate said shaft and drive gear to move the said stem.

3. In a valve construction intended initially for manual operation having a detachable gear unit assembly, the actuating means therefor including a stem and a divided yoke having separable arms, a yoke sleeve fitted between the yoke arms at a hub portion thereof upon drawing up the arms, a hollow adaptor element attached to the yoke enclosing said yoke sleeve, a drive sleeve member overlying and receiving an end portion of the said stem, a housing for the drive sleeve, a second adaptor cooperating with the said drive sleeve and being rotatably movable with the said latter member to axially move the said stem upon predetermined rotation of said yoke sleeve, the said drive sleeve being journally supported within an opening in the said housing, a driven gear non-rotatably mounted relative to the said drive sleeve, a pinion gear cooperating with the said driven gear to drive the latter gear, a shaft journaled in the said housing to support the said pinion gear, the means for attaching the hollow adaptor element to the said yoke including an adaptor plate for attachment to the separable yoke arms, the said plate being held firmly to the arms by bolt means, the latter means also drawing up the arms of the yoke at the hub portion around said yoke sleeve, the said shaft having adaptor means for attachment to a removable driver element whereby to rotate the second adaptor and the drive sleeve to move said stem.

4. Demountable actuating means for a valve or the like having a movable stem, removable actuating means for the stem, and closure means actuated by movement of the stem, an adaptor member mountable over the said stem upon removal of a predetermined portion of said stem actuating means, a bonnet member for supporting said adaptor member, a drive sleeve having a lower hollow rim portion thereof engageable by a peripheral portion of the said adaptor member, a driven gear non-rotatably mounted on the drive sleeve, a housing for the drive sleeve and driven gear, a fixed bonnet adaptor engaging an outer annular portion of the said bonnet member for support of the said housing and having an upwardly opening chamber for receiving the said stem adaptor member, the said housing being connected to the outer limits of said upwardly opening chamber, a drive gear in the housing meshing with the said driven gear, a shaft for the said drive gear having a portion thereof accessible for actuation outside of the housing, the end portion of the said shaft having means thereon for permitting optionally the manual operation thereof or the attachment of a motor driven means thereto to rotate said shaft and gears to operate the valve.

5. In an attachable valve operator for a normally direct handwheel operated valve with a stem, the combination of a yoke, a stationary hollow adaptor cooperating with the said yoke to fit over the said stem, a rotatable adaptor mounted upon and cooperating with said stem to non-rotatably engage the latter member at an outer end portion thereof, a rotatable drive sleeve engaging an outer end of said rotatable adaptor, combined driver and driven means for effecting the rotative movement of the said drive sleeve comprising a gear and pinion therefor, a housing on the stationary hollow adaptor for enclosing the gear and pinion, the said gear being mounted on the said rotatable drive sleeve in non-rotatable relation thereto, an actuating shaft cooperating with the pinion and projecting from an end of the said housing, the said actuating shaft being journaled in the housing on an axis substantially at right angles to the axis of rotation of said stem, engaging means provided between the said drive sleeve and the stem adaptor, and means on an outer end of the said shaft providing for attachment to a portable driving means.

6. In an attachable actuating means for a valve or the like having an axially movable stem, removable actuating means for the said stem, a freely rotatable yoke sleeve for the stem, an adaptor member cooperating with said yoke sleeve to rotate the latter member predeterminately, a yoke member journally enclosing at least an outer cylindrical portion of said yoke sleeve, an adaptor member for the said yoke member, a drive sleeve above the yoke sleeve to receive at least a portion of the latter member and having a lower portion thereof engageable for effecting rotation of the said yoke sleeve adaptor member, a driven gear non-rotatably mounted on the said drive sleeve, a housing for the drive sleeve and driven gear supported by the said yoke adaptor at an inner annular portion thereof, a drive gear in the housing meshing with the said driven gear, an actuating shaft for the said drive gear having an end portion thereof extending exteriorly from the said housing, the latter shaft portion having means thereon for permitting selectively manual operation thereof or attachment of a motor driven means to actuate said shaft.

References Cited in the file of this patent
UNITED STATES PATENTS

| | | |
|---|---|---|
| 1,420,635 | Klopper | June 27, 1922 |
| 1,749,310 | Belcher | Mar. 4, 1930 |
| 2,297,597 | White | Sept. 29, 1942 |
| 2,324,211 | Hodgson et al. | July 13, 1943 |
| 2,859,639 | Bryant | Nov. 11, 1958 |
| 2,861,473 | Alman et al. | Nov. 25, 1958 |
| 2,942,495 | Milleville | June 28, 1960 |
| 2,964,961 | Gulick | Dec. 20, 1960 |